(12) United States Patent
Gao et al.

(10) Patent No.: US 6,878,490 B2
(45) Date of Patent: Apr. 12, 2005

(54) POSITIVE ELECTRODE ACTIVE MATERIALS FOR SECONDARY BATTERIES AND METHODS OF PREPARING SAME

(75) Inventors: Yuan Gao, Monroe, NJ (US); Marina Yakovleva, Gastonia, NC (US); Michael E. Leonowicz, Charlotte, NC (US); Prakash Palepu, Gastonia, NC (US); John F. Engel, Belmont, NC (US)

(73) Assignee: FMC Corporation, Philadelphia, PA (US)

( * ) Notice: Subject to any disclaimer, the term of this patent is extended or adjusted under 35 U.S.C. 154(b) by 169 days.

(21) Appl. No.: 10/040,047

(22) Filed: Oct. 29, 2001

(65) Prior Publication Data

US 2003/0035999 A1 Feb. 20, 2003

Related U.S. Application Data

(60) Provisional application No. 60/313,631, filed on Aug. 20, 2001.

(51) Int. Cl.[7] .......................... H01M 4/48; H01M 4/52; C01G 49/04; C01G 51/04; C01G 43/04
(52) U.S. Cl. .................... 429/231.1; 429/221; 429/223; 429/232; 429/231.3; 429/231.5; 252/182.1; 423/594.2; 423/594.4; 423/594.6; 423/594.12; 423/598
(58) Field of Search ............................. 429/209, 218.1, 429/221, 223, 231.1, 231.3, 231.5, 232; 252/182.1; 423/594.2, 594.4, 594.6, 594.12, 598

(56) References Cited

U.S. PATENT DOCUMENTS 4,465,747 A 8/1984 Evans
4,992,342 A 2/1991 Singh et al.

(Continued)

FOREIGN PATENT DOCUMENTS

| EP | 0265950 | 5/1988 | .......... H01M/10/40 |
| EP | 0589294 | 3/1994 | ............ H01M/4/50 |

(Continued)

OTHER PUBLICATIONS

Choblet et al., *Two–Phase LiCoO2 Oxides for Rechargeable Lithium Batteries*, Electrochemical and Solid–State Letters, 4 (6) A65–A67 (2001). (Apr.).

(Continued)

*Primary Examiner*—Stephen J. Kalafut
(74) *Attorney, Agent, or Firm*—Myers Bigel Sibley & Sajovec, P.A.

(57) ABSTRACT

The present invention is a positive electrode active material that can be used in secondary lithium and lithium-ion batteries to provide the power capability, i.e., the ability to deliver or retake energy in short periods of time, desired for large power applications such as power tools, electric bikes and hybrid electric vehicles. The positive electrode active material of the invention includes at least one electron conducting compound of the formula $LiM^1_{x-y}\{A\}_yO_z$ and at least one electron insulating and lithium ion conducting lithium metal oxide, wherein $M^1$ is a transition metal, $\{A\}$ is represented by the formula $\Sigma w_i B_i$ wherein $B_i$ is an element other than $M^1$ used to replace the transition metal $M^1$ and $w_i$ is the fractional amount of element $B_i$ in the total dopant combination such that $\Sigma w_i = 1$; $B_i$ is a cation in $LiM^1_{x-y}\{A\}_yO_z$; $0.95 \leq x \leq 2.10$; $0 \leq y \leq x/2$; and $1.90 \leq z \leq 4.20$. Preferably, the lithium metal oxide is $LiAlO_2$ or $Li_2M^2O_3$ wherein $M^2$ is at least one tetravalent metal selected from the group consisting of Ti, Zr, Sn, Mn, Mo, Si, Ge, Hf, Ru and Te. The present invention also includes methods of making this positive electrode active material.

80 Claims, 3 Drawing Sheets

U.S. PATENT DOCUMENTS

| | | | |
|---|---|---|---|
| 5,342,712 A | | 8/1994 | Mieczkowska et al. |
| 5,429,890 A | | 7/1995 | Pynenburg et al. |
| 5,443,929 A | | 8/1995 | Yamamoto et al. |
| 5,478,675 A | | 12/1995 | Nagaura |
| 5,919,588 A | | 7/1999 | Jose et al. |
| 6,103,419 A | * | 8/2000 | Saidi et al. ............. 429/221 X |
| 6,261,712 B1 | | 7/2001 | Hayashi et al. ................ 429/49 |
| 6,270,927 B1 | | 8/2001 | Nakane et al. |
| 6,395,426 B1 | | 5/2002 | Imachi et al. ............. 429/231.3 |
| 6,468,693 B1 | * | 10/2002 | Takami et al. ....... 429/231.1 X |
| 6,677,082 B2 | * | 1/2004 | Thackeray et al. ...... 429/223 X |
| 2001/0031397 A1 | * | 10/2001 | Kweon et al. ............ 429/218.1 |
| 2002/0012842 A1 | * | 1/2002 | Tsujimoto et al. .......... 429/224 |
| 2002/0197533 A1 | * | 12/2002 | Gao et al. ................. 429/231.3 |
| 2003/0073001 A1 | * | 4/2003 | Barker et al. ............ 429/231.1 |

FOREIGN PATENT DOCUMENTS

| | | | | |
|---|---|---|---|---|
| EP | 0782206 | | 7/1997 | ............ H01M/4/48 |
| EP | 0814522 | | 12/1997 | ............ H01M/4/48 |
| EP | 0997957 | B1 | 10/1999 | ............ H01M/4/52 |
| JP | 7-192721 | A | 7/1995 | |
| JP | 2000 285918 | | 10/2000 | ............ H01M/4/58 |
| JP | 2001 68149 | | 3/2001 | .......... H01M/10/36 |
| WO | WO 02061865 | | 8/2002 | ............ H01M/4/50 |

OTHER PUBLICATIONS

C.C. Liang, *Conduction Characteristics of the Lithium Iodide–Aluminum Oxide Solid Electrolytes*, Journal of the Electrochemical Society, vol. 120, No. 10, pp. 12891292, (Oct. 1973.).

Boyle, T.J., et al. "Rechargeable Lithium Battery Cathodes, Nonaqueous Synthesis, Characterization, and Electrochemical Properties of $LiCoO_2$" *Chem Mater.* 10:2270–2276 (1998).

Cedar, G., et al. "The Electrochemical Stability of Lithium–Metal Oxides Against Metal Reduction" *Solid State Ionics* 109:151–157 (1998).

International Search Report corresponding to PCT/US02/26141. Mailed on Feb. 27, 2004.

* cited by examiner

POSITIVE ELECTRODE ACTIVE MATERIALS FOR SECONDARY BATTERIES AND METHODS OF PREPARING SAME

CROSS-REFERENCE TO RELATED APPLICATIONS

This application is related to commonly owned co-pending provisional application Ser. No. 60/313,631, filed Aug. 20, 2001, and claims the benefit of the earlier filing date of this application under 35 U.S.C. § 119(e).

FIELD OF THE INVENTION

The present invention relates to positive electrode active materials for secondary (rechargeable) lithium and lithium-ion batteries that provide improved power capability comprising at least one electron conducting compound of the formula $LiM^1_{x-y}\{A\}_yO_z$ and at least one electron insulating and lithium ion conducting lithium metal oxide, wherein $M^1$, $\{A\}$, x, y and z are as discussed herein.

BACKGROUND OF THE INVENTION

Secondary (rechargeable) lithium and lithium-ion batteries have become the standard in today's marketplace for use in portable electronics. Recently, there has been a desire to use these secondary batteries in new markets where high power capabilities are necessary, such as with power tools, electric bikes and hybrid electric vehicles (HEVs). In particular, these applications require batteries that have the ability to deliver or retake energy in short periods of time. In addition, there continues to be a need to increase the safety and decrease the cost of these secondary batteries, particularly in these new markets.

The positive electrode active materials typically used for secondary lithium and lithium-ion batteries are lithium metal oxides such as $LiCoO_2$, $LiNiO_2$, and $LiMn_2O_4$. Although these active materials have been successfully used with portable electronics, these materials do not possess the high power capabilities needed for use with power tools, electric bikes and hybrid electric vehicles (HEVs). Accordingly, there is a need to provide new positive electrode active materials for these new markets.

SUMMARY OF THE INVENTION

The present invention is a positive electrode active material that can be used in secondary lithium and lithium-ion batteries to provide the power capability, i.e., the ability to deliver or retake energy in short periods of time, desired for large power applications such as power tools, electric bikes and hybrid electric vehicles. Furthermore, the positive electrode active material of the invention is safe and can be produced at a low cost as desired in the art.

As described in U.S. patent application Ser. No. 08/954,372 filed on Oct. 20, 1997, now abandoned, and U.S. patent application Ser. No. 09/078,849 filed on May 14, 1998, now U.S. Pat. No. 6,277,521, issued Aug. 21, 2001, both of which are incorporated by reference herein in their entirety, we have found that doping lithium metal oxides such as nickel, cobalt, and nickel/cobalt oxides with certain combinations of dopants such as Ti and Mg increases the safety of these lithium metal oxides when used in secondary lithium and lithium-ion batteries by providing these lithium metal oxides with overcharge protection. In working with these doped lithium metal oxides, we unexpectedly discovered that when part of the Ti is not in the main lithium metal oxide phase, or in other words, when some of the titanium appears as a separate phase, and particularly in the form of $Li_2TiO_3$ and optionally additionally $TiO_2$, the material has a higher power capability and/or lower impedance than conventional materials when used as the positive electrode active material in secondary lithium and lithium-ion batteries. The reduced impedance of the positive electrode active material improves the power capability of the secondary lithium or lithium-ion battery and allows the battery to deliver or retake energy in short periods of time. Therefore, the positive electrode active material of the invention, when used with secondary lithium and lithium-ion secondary batteries, is suitable for use in large power applications such as with power tools, electric bikes, and HEVs. In addition to Ti, it is believed that other tetravalent metals such as Zr, Sn, Mn, Mo, Si, Ge, Hf, Ru and Te and that Al will produce similar effects when present as separate lithium metal oxide phases in the positive electrode active material.

The present invention is a positive electrode active material for secondary lithium and lithium-ion batteries comprising at least one electron conducting compound having the formula $LiM^1_{x-y}\{A\}_yO_z$ and at least one electron insulating and lithium ion conducting lithium metal oxide wherein $M^1$ is a transition metal, $\{A\}$ is represented by the formula $\Sigma w_iB_i$ wherein $B_i$ is an element other than $M^1$ used to replace the transition metal $M^1$ and $w_i$ is the fractional amount of element $B_i$ in the total dopant combination such that $\Sigma w_i=1$; $B_1$ is a cation in $LiM^1_{x-y}\{A\}_yO_z$; $0.95 \leq x \leq 2.10$; $0 \leq y \leq x/2$; and $1.90 \leq z \leq 4.20$. The electron insulating and lithium ion conducting lithium metal oxide is selected from the group consisting of $LiAlO_2$ and $Li_2M^2O_3$, wherein $M^2$ is at least one tetravalent metal selected from the group consisting of Ti, Zr, Sn, Mn, Mo, Si, Ge, Hf, Ru and Te. Preferably, $M^2$ is Ti, Zr, Sn, Mn, or a mixture thereof and more preferably, $M^2$ is Ti, Zr, or a mixture thereof. In addition, x and z are preferably represented by the following relationships: $0.95 \leq x \leq 1.05$ and $1.90 \leq z \leq 2.10$. The values for x, y and z are preferably selected to produce a stable lithium metal oxide compound. For example, stable compounds can be produced where x=1, y is as described above and z=2. In addition, stable compounds can be produced where x=2, y is as described above and z=4. The positive electrode active material preferably includes from greater than or equal to 95% by weight and less than 100% by weight of the $LiM^1_{x-y}\{A\}_yO_z$ compound and greater than 0% by weight and less than or equal to 5% by weight of the $Li_2M^2O_3$ or $LiAlO_2$ compound. The positive electrode active material can also include an electron insulating and lithium ion conducting metal oxide such as a metal oxide of the formula $MO_2$ wherein M is selected from the group consisting of Ti, Zr, Sn, Mo, Si, Ge, Hf, Ru and Te (e.g. $TiO_2$).

In a preferred embodiment of the invention, $M^1$ is selected from Co, Ni, Mn, Ti, Fe, Cr, V and Mo. More preferably, $M^1$ is selected from Co, Ni, Mn and Ti. Moreover, the $LiM^1_{x-y}\{A\}_yO_z$ compound preferably includes one or more dopants, i.e., y>0. The dopant elements $B_i$ are preferably selected from the group consisting of elements having a Pauling's electronegativity not greater than 2.05, Mo, Te and Ru. More preferably, the dopant elements $B_i$ include two or more dopant cations. The average oxidation state E of the dopant elements $B_i$, as determined using the formula $E=\Sigma w_iE_i$ wherein $E_i$ is the oxidation state of dopant element $B_i$ in the lithium metal oxide $LiM^1_{x-y}\{A\}_yO_z$, preferably equals the oxidation state of the replaced transition metal ion $M^1 \pm 0.5$, more preferably equals the oxidation state of the replaced transition metal ion $M^1 \pm 0.1$, and even more preferably equals the oxidation state of the replaced transition metal ion $M^1$. For example, when x and z are represented by the relationships $0.95 \leq x \leq 1.05$ and $1.90 \leq z \leq 2.10$, the average oxidation state E of the dopant elements $B_i$ is preferably represented by the relationship $2.5 \leq E \leq 3.5$, more preferably represented by the relationship $2.9 \leq E \leq 3.1$, and even more preferably equals 3. Moreover, preferably at least one, and more preferably at least two, of the dopant elements $B_i$ have a different oxidation state than $M^1$ in $LiM^1_{x-y}\{A\}_yO_z$. In addition, the metal $M^2$ is preferably present in the $LiM^1_{x-y}\{A\}_yO_z$ compound as $M^1$ or as a dopant element $B_i$, e.g., either $M^1$ is Ti or the dopant elements $B_i$ include Ti, or Al is present as a dopant element $B_i$.

In a more preferred embodiment of the invention, x=1, z=2 and $M^1$ is Ni or Co, and more preferably $M^1$ is Ni. For example, the positive electrode material can be represented by the formula $LiNi_{1-y}Co_aM^3_bM^4_cO_2$, wherein $M^3$ is selected from the group consisting of Ti, Zr, and combinations thereof; $M^4$ is selected from the group consisting of Mg, Ca, Sr, Ba, and combinations thereof; y=a+b+c, $0<y \leq 0.5$; $0<a<0.5$; $0<b \leq 0.15$; and $0<c \leq 0.15$. In this formula, the value for y is typically represented by $0.1 \leq a \leq 0.3$. Preferably, the dopant elements $B_i$ (or $M^3$ and $M^4$ in the above formula) include $Ti^{4+}$ and $Mg^{2+}$ and, in this case, $M^2$ in the $Li_2M^2O_3$ compound preferably includes Ti. In this embodiment, the fractional amount of $Ti^{4+}$ is preferably approximately equal to the fractional amount of $Mg^{2+}$. The dopant elements $B_1$ in the $LiM^1_{x-y}\{A\}_yO_z$ compound can also include $Li^+$.

The present invention further includes a positive electrode for a secondary lithium or lithium-ion battery comprising the positive electrode active material described above, a carbonaceous material and a binder polymer. Moreover, the present invention includes a secondary lithium or lithium-ion battery comprising a positive electrode, a negative electrode and a nonaqueous electrolyte, wherein the positive electrode includes the positive electrode active material described above.

The present invention also includes a method of preparing a positive electrode active material for secondary lithium and lithium-ion batteries that includes at least one electron conducting compound having the formula $LiM^1_{x-y}\{A\}_yO_z$ and at least one electron insulating and lithium ion conducting lithium metal oxide such as $LiAlO_2$ and $Li_2M^2O_3$ as discussed above. In a preferred method embodiment of the invention, the method of preparing a positive electrode active material for secondary lithium and lithium-ion batteries comprises preparing separate lithium metal oxide phases in situ corresponding to the formulas $LiM^1_{x-y}\{A\}_yO_z$ and $Li_2M^2O_3$ or $LiAlO_2$ wherein at least one of $M^1$ and $B_i$ is the same as $M^2$ or $B_i$ is Al. In this method, source compounds containing $M^1$, Li and optionally $\{A\}$ are intimately mixed in amounts sufficient to provide a stoichiometric relationship between $M^1$, Li and $\{A\}$ corresponding to the formula $LiM^1_{x-y}\{A\}_yO_z$ wherein $M^1$ is a transition metal, $\{A\}$ is represented by the formula $\Sigma w_iB_i$ wherein $B_i$ is an element other than $M^1$ used to replace the transition metal $M^1$ and $w_i$ is the fractional amount of element $B_1$ in the total dopant combination such that $\Sigma w_i=1$; $B_i$ is a cation in $LiM^1_{x-y}\{A\}_yO_z$; one of $M^1$ and $B_i$ is selected from the group consisting of Ti, Zr, Sn, Mn, Mo, Si, Ge, Hf, Ru and Te, or $B_i$ includes Al; $0.95 \leq x \leq 2.10$; $0 \leq y \leq x/2$; and $1.90 \leq z \leq 4.20$. The mixture is then fired in the presence of oxygen at an initial firing temperature and optionally one or more additional firing temperatures and then cooled. Preferably, at least one of the initial and optionally one or more additional firing temperatures is between about 700° C. and about 1000° C. The firing step comprises heating the mixture from 500° C. to the maximum firing temperature at a sufficiently slow rate to produce separate lithium metal oxide phases including $LiM^1_{x-y}\{A\}_yO_z$ and $Li_2M^2O_3$ or $LiAlO_2$, wherein $M^2$ is one of $M^1$ and $B_i$ and selected from the group consisting of Ti, Zr, Sn, Mn, Mo, Si, Ge, Hf, Ru and Te, or $B_i$ includes Al. More preferably, $M^2$ is Ti, Zr, or mixtures thereof, and even more preferably includes Ti. Preferably, the firing step comprises heating the mixture from 500° C. to the maximum firing temperature at an average rate of less than or equal to about 10° C./min. The firing step preferably includes heating the mixture from 500° C. to the maximum firing temperature at a sufficiently slow rate to produce separate lithium metal oxide phases including $LiM^1_{x-y}\{A\}_yO_z$ and $Li_2M^2O_3$ or $LiAlO_2$ such that the lithium metal oxide phases include greater than or equal to 95% by weight and less than 100% by weight of $LiM^1_{x-y}\{A\}_yO_z$ and greater than 0% by weight and less than or equal to 5% by weight of $Li_2M^2O_3$ or $LiAlO_2$. The firing step can also include heating the mixture from 500° C. to the maximum firing temperature at a sufficiently slow rate to produce separate lithium metal oxide phases including $LiM^1_{x-y}\{A\}_yO_z$, $Li_2M^2O_3$ and $M^2O_2$ wherein $M^2$ is one of $M^1$ and $B_i$ and is selected from the group consisting of Ti, Zr, Sn, Mo, Si, Ge, Hf, Ru and Te.

The $LiM^1_{x-y}\{A\}_yO_z$ compound is preferably made by firing the mixture of source compounds at one or more firing temperatures between 700° C. and 1000° C. in an atmosphere with a partial pressure of oxygen of at least 20 kPa. In addition, the source compounds preferably contain a transition metal $M^1$ selected from the group consisting of Co, Ni, Mn, Ti, Fe, Cr, V and Mo, and more preferably selected from the group consisting of Co, Ni, Mn and Ti. The mixing step generally includes dry mixing the source compounds but wet methods can be used as discussed above. Preferably, the mixing step comprises mixing source compounds including dopant elements $B_i$ such that y>0, and more preferably two or more dopant elements $B_i$. The dopant elements $B_i$ are preferably selected from the group consisting of elements having a Pauling's electronegativity not greater than 2.05, Mo, Te and Ru. Moreover, the average oxidation state E of the dopant elements $B_i$, preferably equals the oxidation state of the replaced transition metal ion $M^1 \pm 0.5$, more preferably equals the oxidation state of the replaced transition metal ion $M^1 \pm 0.1$, and even more preferably equals the oxidation state of the replaced transition metal ion $M^1$. Preferably, at least one and more preferably at least two of the dopant elements $B_i$ has a different oxidation state than $M^1$ in $LiM^1_{x-y}\{A\}_yO_z$. As described above, a preferred $LiM^1_{x-y}\{A\}_yO_z$ compound of the invention contains Ni as the transition metal $M^1$ and can be represented by the formula $LiNi_{1-y}Co_aM^3_bM^4_cO_2$ wherein $M^3$ is selected from the group consisting of Ti, Zr, and combinations thereof; $M^4$ is selected from the group consisting of Mg, Ca, Sr, Ba, and combinations thereof; y=a+b+c, $0<y \leq 0.5$; $0<a<0.5$; $0<b \leq 0.15$; and $0<c \leq 0.15$. This compound is formed by mixing source compounds containing Li, Ni, Co, $M^3$ and $M^4$ in amounts sufficient to provide a stoichiometric relationship between Li, Ni, Co, $M^3$ and $M^4$ corresponding to above formula. More preferably, $Ti^{4+}$ and $Mg^{2+}$ are the dopant elements $M^3$ and $M^4$ (i.e., $B_i$ in the formula $LiM^1_{x-y}\{A\}_yO_z$). The $LiM^1_{x-y}\{A\}_yO_z$ compound can also include $Li^+$ as a dopant element $B_i$.

These and other features and advantages of the present invention will become more readily apparent to those skilled in the art upon consideration of the following detailed description and accompanying drawings, which describe both the preferred and alternative embodiments of the present invention.

DETAILED DESCRIPTION OF THE PREFERRED EMBODIMENTS

Figure 1:
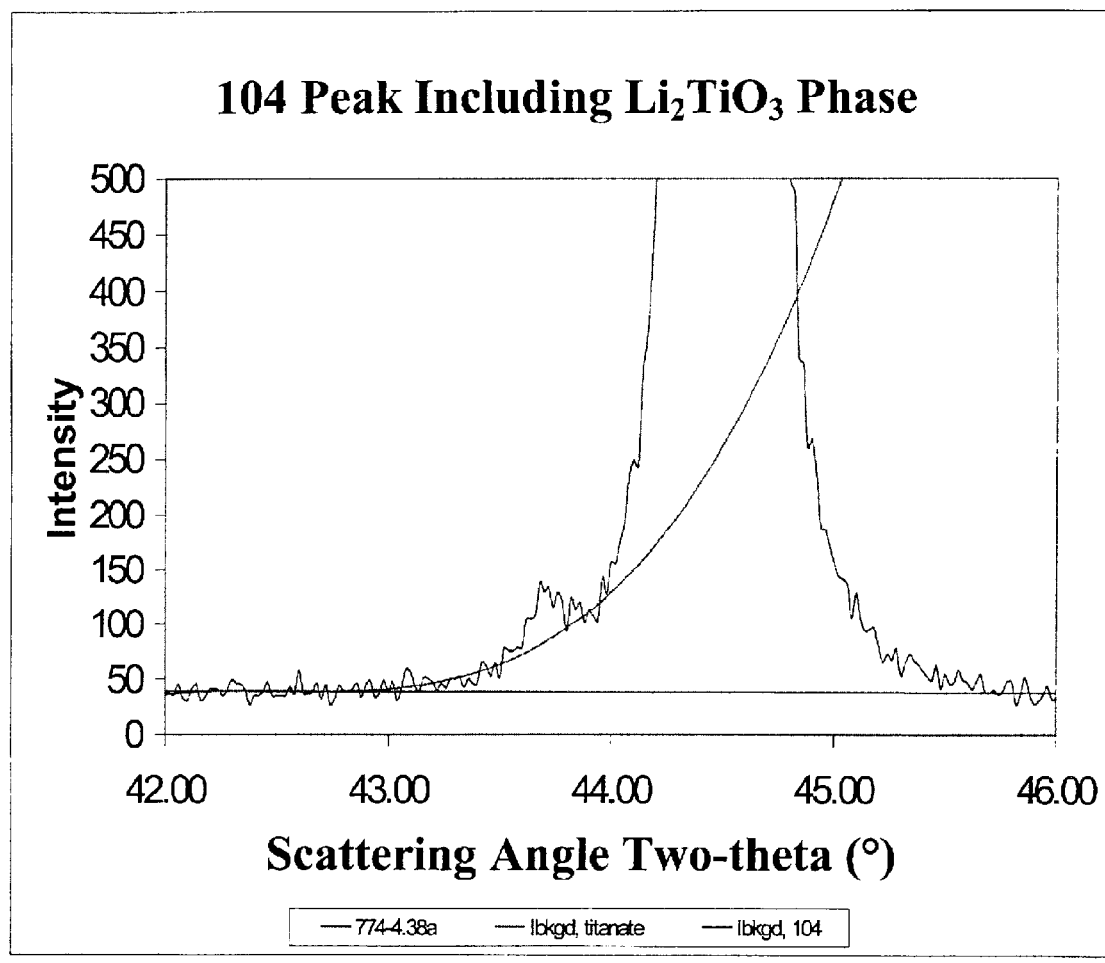
FIG. 1 is a powder x-ray diffraction diagram for a $LiNi_{0.7}Co_{0.2}Ti_{0.05}Mg_{0.05}O_2$ and $Li_2TiO_3$ mixture illustrating the lower portion of the peak representing $LiNi_{0.7}Co_{0.2}Ti_{0.05}Mg_{0.05}O_2$ ($2\theta=44.5°$) and illustrating the peak representing $Li_2TiO_3$ ($2\theta=43.7°$) at the foot of the $LiNi_{0.7}Co_{0.2}Ti_{0.05}Mg_{0.05}O_2$ peak.

In the following detailed description and accompanying drawings, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings.

The present invention is a positive electrode active material for secondary lithium and lithium-ion batteries comprising at least one electron conducting compound having the formula $LiM^1_{x-y}\{A\}_yO_z$ and at least one electron insulating and lithium ion conducting lithium metal oxide. The $LiM^1_{x-y}\{A\}_yO_z$ compound is a doped or undoped lithium metal oxide compound and these compounds are known in the art as intercalation or insertion compounds. In the $LiM^1_{x-y}\{A\}_yO_z$ compound, $M^1$ is a transition metal such as Co, Ni, Mn, Ti, Fe, Cr, V or Mo. In more preferred embodiments of the invention, $M^1$ is Co, Ni, Mn or Ti, and even more preferably is Co or Ni. As discussed below, $\{A\}$ represents dopant cations in the $LiM^1_{x-y}\{A\}_yO_z$ compound. The values for x, y and z are represented by the relationships $0.95 \leq x \leq 2.10$; $0 \leq y \leq x/2$; and $1.90 \leq z \leq 4.20$. Preferably, x is represented by the relationship $0.95 \leq x \leq 1.05$ and more preferably x=1. In addition, y is preferably represented by the relationship $0 \leq y \leq 0.3x$, and thus when x=1, y is preferably from greater than or equal to 0 to less than or equal to 0.3. The value for z is preferably represented by the relationship $1.90 \leq z \leq 2.10$ and more preferably z=2. The values for x, y and z in the $LiM^1_{x-y}\{A\}_yO_z$ compound are preferably selected to produce a stable, lithium metal oxide compound. In other words, the values for x, y and z produce a lithium metal oxide that can exist substantially in a single phase (e.g. 95% or more, and more preferably 99% or more, of the material is in a single phase). For example, stable compounds can be produced where x=1, y is as described above and z=2. In addition, stable compounds can be produced where x=2, y is as described above and z=4. Suitable lithium metal oxides corresponding to the formula $LiM^1_{x-y}\{A\}_yO_z$ in accordance with the present invention include doped (wherein y>0) and undoped (wherein y=0) lithium metal oxides of the formulas $LiNiO_2$, $LiCoO_2$, $LiMnO_2$ (including $Li_2Mn_2O_4$), $LiMn_2O_4$ and the like.

In the $LiM^1_{x-y}\{A\}_yO_z$ compound, $\{A\}$ is represented by the formula $\Sigma w_iB_i$ wherein $B_i$ is an element other than $M^1$ and $w_i$ is the fractional amount of element $B_i$ in the total dopant combination such that $\Sigma w_i = 1$. The dopant elements are used to replace the transition metal $M^1$ in the $LiM^1_{y-x}\{A\}_yO_z$ compound and thus $B_i$ is a cation in the compound. The dopant elements $B_i$ are any elements other than $M^1$ selected from the group consisting of elements having a Pauling's electronegativity not greater than 2.05, Mo, Te and Ru. Accordingly, the dopant elements are preferably selected from Li, Be, Mg, Ca, Sr, Ba, Sc, Y, La, Ti, Zr, Hf, V, Nb, Ta, Cr, Mo, Te, Ru, Mn, Fe, Co, Ni, Cu, Zn, Cd, B, Al, Ga, In, Si, Ge, Ge, Sn, Sb, Bi and Po. More preferably, the dopant elements include Li, Mg, Ca, Sr, Ba, Ti, Zr, V, Cr, Mn, Fe, Co, Ni, Al, Ga, Si, Ge and Sn.

As would be understood by those skilled in the art, when y>0, the lithium metal oxide is considered a doped lithium metal oxide compound. The dopant elements $B_i$ can include one dopant element (e.g., $LiNi_{0.5}Co_{0.5}O_2$) or, in one preferred embodiment of the invention, the dopant elements $B_1$ can include two or more dopant cations. Preferably, the average oxidation state E of the dopant elements $B_i$, as determined using the formula $E = \Sigma w_iE_i$ wherein $E_i$ is the oxidation state of dopant element $B_i$ in the lithium metal oxide $LiM^1_{x-y}\{A\}_yO_z$, preferably equals the oxidation state of the replaced transition metal ion $M^1 \pm 0.5$. More preferably, E equals the oxidation state of the replaced transition metal ion $M^1 \pm 0.1$ and even more preferably equals the oxidation state of the replaced transition metal ion $M^1$. For example, when x=1 and z=2 (e.g. $LiNi_{1-y}\{A\}_yO_2$ and $LiCo_{1-y}\{A\}_yO_2$), the value for E is preferably represented by the relationship $2.5 \leq E \leq 3.5$, more preferably represented by the relationship $2.9 \leq E \leq 3.1$, and even more preferably equals 3. Moreover, preferably at least one, and more preferably at least two, of the dopant elements $B_1$ have a different oxidation state than $M^1$ in $LiM^1_{x-y}\{A\}_yO_z$. For example, the dopants can include $Ti^{4+}$ and $Mg^{2+}$ and preferably the molar amount of $Ti^{4+}$ is approximately equal to the molar amount of $Mg^{2+}$ to provide a value of E approximately equal to 3. In this situation, the transition metal $M^1$ is replaced with $[0.5\ Ti^{4+} + 0.5\ Mg^{2+}]$ to produce $LiM^1_{1-y}Ti_{0.5y}Mg_{0.5y}O_2$.

In accordance with the invention, the dopant elements $B_i$ replace the transition metal $M^1$ and not the lithium in the $LiM^1_{x-y}\{A\}_yO_z$ compound to maximize the specific capacity of the lithium metal oxide compound. In other words, the ratio of Li to O in the doped intercalation compound (wherein y>0) is not smaller than the ratio of Li to O in the undoped compound $LiM^1_xO_z$ (where y=0). However, the dopant elements $B_1$ in the $LiM^1_{x-y}\{A\}_yO_z$ compound can include $Li^+$. For example, in accordance with the invention, the transition metal $M^1$ can be replaced by $[0.6\ Ti^{4+} + 0.2\ Mg^{2+} + 0.2\ Li^+]$ to produce $LiM^1_{1-y}Ti_{0.6y}Mg_{0.2y}Li_{0.2y}O_2$, or stated differently, $Li_{1+0.2y}M^1_{1-y}Ti_{0.6y}Mg_{0.2y}O_2$. Alternatively, the two dopant cations in the preferred embodiment can be $Ti^{4+}$ and $Li^+$, such that $M^1$ is replaced by $[0.667\ Ti^{4+} + 0.333\ Li^+]$ to produce $LiM^1_{1-y}Ti_{0.667y}Li_{0.333y}O_2$ or $Li_{1+0.333y}M^1_{1-y}Ti_{0.667y}O_2$.

In a particularly preferred embodiment of the invention, $M^1$=Ni, the dopant elements $B_i$ include Co, $M^3$ and $M^4$, x=1 and z=2, and the $LiM^1_{x-y}\{A\}_yO_z$ compound can be represented by the formula $LiNi_{1-y}Co_aM^3_bM^4_cO_2$, wherein $M^3$ is selected from the group consisting of Ti, Zr, and combinations thereof; $M^4$ is selected from the group consisting of Mg, Ca, Sr, Ba, and combinations thereof; y=a+b+c, $0 < y \leq 0.5$; $0 < a < 0.5$; $0 < b \leq 0.15$; and $0 < c \leq 0.15$. In this embodiment, a is typically represented by the relationship $0.1 \leq a \leq 0.3$. Moreover, $M^3$ and $M^4$ preferably include $Ti^{4+}$ and $Mg^{2+}$, respectively. In addition, the molar amount of $Ti^{4+}$ is preferably approximately equal to the molar amount of $Mg^{2+}$. Exemplary compounds in accordance with this embodiment include $LiNi_{0.7}Co_{0.1}Ti_{0.1}Mg_{0.1}O_2$, $LiNi_{0.75}Co_{0.15}Ti_{0.05}Mg_{0.05}O_2$, and $LiNi_{0.7}Co_{0.2}Ti_{0.05}Mg_{0.05}O_2$.

As described above, the positive electrode active material of the invention also includes at least one electron insulating and lithium ion conducting lithium metal oxide. The term "lithium metal oxide" as used herein refers to oxides of lithium and at least one additional metal and is generally used in this application to refer to electron insulating and lithium ion conducting lithium metal oxides. The term "metal" as used herein refers not only to transition metals but also to other metals and semimetals such as Al, Si and Ge. The lithium metal oxides are preferably selected from the group consisting of $LiAlO_2$ and $Li_2M^2O_3$, wherein $M^2$ is at least one tetravalent metal selected from the group consisting of Ti, Zr, Sn, Mn, Mo, Si, Ge, Hf, Ru and Te. Preferably, the lithium metal oxide is of the formula $Li_2M^2O_3$ and $M^2$ is Ti, Zr, Sn, Mn, or a mixture thereof and more preferably, $M^2$ is Ti, Zr or a mixture thereof. Typically, $M^2$ includes Ti. The metal $M^2$ is preferably also present in the $LiM^1_{x-y}\{A\}_yO_z$ compound as $M^1$ or as a dopant element $B_i$ (e.g. either $M^1$ is Ti or the dopant elements $B_1$ include Ti), or the dopant elements $B_i$ include Al. More preferably, as discussed above, $M^1$ is Co, Ni, Mn or Ti, and even more preferably, $M^1$ is Co or Ni and the dopant elements $B_i$ include Ti.

In addition to the $LiM^1_{x-y}\{A\}_yO_z$ compound and the lithium metal oxide, the positive electrode active material of the present invention can further include an electron insulating and lithium ion conducting metal oxide. Preferably, the metal oxide has the formula $MO_2$ wherein M is a tetravalent metal selected from the group consisting of Ti, Zr, Sn, Mo, Si, Ge, Hf, Ru and Te (e.g. $TiO_2$). Although $Li_2MnO_3$ is suitable as a lithium metal oxide for use in the invention, $MnO_2$ is too reactive with the electrolyte in the secondary lithium or lithium ion battery and thus M is preferably not Mn. Typically, $M=M^2$ and the $MO_2$ compound is formed by the incomplete conversion of source compounds containing $M^2$ into the $LiM^1_{x-y}\{A\}_yO_z$ or $Li_2M^2O_3$ compound.

The positive electrode active material preferably includes from greater than or equal to 95% by weight and less than 100% by weight of the $LiM^1_{x-y}\{A\}_yO_z$ compound and greater than 0% by weight and less than or equal to 5% by weight of the lithium metal oxide (i.e., $LiAlO_2$ or $Li_2M^2O_3$), based on the total weight of the positive electrode active material (not including additives such as the carbonaceous materials and polymer binders discussed below). More preferably, the positive electrode active material preferably includes from greater than or equal to 97% by weight and less than 100% by weight of the $LiM^1_{x-y}\{A\}_yO_z$ compound and greater than 0% by weight and less than or equal to 3% by weight of the lithium metal oxide (e.g., 98–99.5% $LiM^1_{x-y}\{A\}_yO_z$ and 0.5–2% $LiAlO_2$ or $Li_2M^2O_3$). It is preferred that the positive electrode active material includes less than or equal to 5% of the lithium metal oxide because if it includes more than 5% of the lithium metal oxide, it results in reduced specific capacity. When the positive electrode active material includes both electron insulating and lithium ion conducting lithium metal oxides and metal oxides, the total amount of these compounds is less than or equal to 5% by weight, more preferably less than or equal to 3% by weight in the positive electrode active material.

The presence of the $LiM^1_{x-y}\{A\}_yO_z$ compound, the lithium metal oxide (e.g. $LiAlO_2$ or $Li_2M^2O_3$) and the optional metal oxide (e.g. $MO_2$) in the positive electrode active material can be determined by any method known to those skilled in the art. For example, these compounds can be detected using x-ray diffraction by measuring the areas under the peaks representing the above compounds (e.g. $LiNi_{1-y}Co_aTi_bMg_cO_2$, $Li_2TiO_3$ and $TiO_2$) to determine the relevant amounts of each compound.

The present invention also includes methods of preparing a positive electrode active material for secondary lithium and lithium-ion batteries that includes the electron conducting $LiM^1_{x-y}\{A\}_yO_z$ compound, the electron insulating and lithium ion conducting lithium metal oxide (e.g. $LiAlO_2$ or $Li_2M^2O_3$) and the optional electron insulating and lithium ion conducting metal oxide (e.g. $MO_2$). In a preferred method embodiment of the invention, the method of preparing a positive electrode active material for secondary lithium and lithium-ion batteries consists of preparing separate lithium metal oxide phases in situ corresponding to the formulas $LiM^1_{x-y}\{A\}_yO_z$, $Li_2M^2O_3$ or $LiAlO_2$ and optionally $M^2O_2$ wherein at least one of $M^1$ and $B_i$ is the same as $M^2$ or $B_i$ includes Al. According to this embodiment, $M^2$, i.e., one of $M^1$ and $B_i$, is preferably selected from the group consisting of Ti, Zr, Sn, Mn, Mo, Si, Ge, Hf, Ru and Te; is more preferably Ti, Zr or a mixture thereof; and typically includes Ti.

In the preferred method embodiment of the invention, source compounds containing $M^1$, Li and optionally $\{A\}$ are intimately mixed in amounts sufficient to provide a stoichiometric relationship between $M^1$, Li and $\{A\}$ corresponding to the formulas $LiM^1_{x-y}\{A\}_yO_z$, $Li_2M^2O_3$ or $LiAlO_2$ and optionally $M^2O_2$ as described above. Preferably, in order to provide the source compounds in amounts sufficient to provide the desired stoichiometric relationship, an excess of lithium source compounds (e.g. up to 10%) is provided. For example, to produce a compound of the formula $LiNiO_2$, the ratio of lithium to nickel fed can be between 1:1 and 1.1:1. Typically, the excess of lithium source compounds used (if any) is dependent on the source compounds used, the mixing methods used, the $LiM^1_{x-y}\{A\}_yO_z$, $Li_2M^2O_3$ or $LiAlO_2$, and optional $M^2O_2$ compounds being formed, and the process used to make the $LiM^1_{x-y}\{A\}_yO_z$, $Li_2M^2O_3$ or $LiAlO_2$, and optional $M^2O_2$ compounds, as would be understood by those skilled in the art.

The source compounds (raw materials) can be the pure elements but are typically compounds containing the elements such as oxides or salts thereof. For example, the source compounds are typically hydrated or anhydrous oxides, hydroxides, carbonates, nitrates, sulfates, chlorides or fluorides, but can be any other suitable source compound that will not cause elemental defects in the resulting intercalation compound. Preferably, the source compounds are oxides, hydroxides or carbonates as the gaseous by-products formed by firing these compounds tend to be more environmentally friendly. The elements for the lithium metal oxides can each be supplied from separate source compounds or at least two of the elements can be supplied from the same source compounds. In addition, the source compounds can be mixed in any desirable order.

For one of the preferred $LiM^1_{x-y}\{A\}_yO_z$ electron conducting compounds of the invention discussed above represented by the formula $LiNi_{1-x}Co_yM^3_aM^4_bO_2$, a lithium source compound, a nickel source compound, a cobalt source compound, a titanium source compound and a magnesium source compound are mixed in any desired order to give the desired molar ratio according to the formula $LiNi_{1-x}Co_yM^3_aM^4_bO_2$, typically with excess lithium source compounds used as discussed above. Suitable source compounds for the invention include a lithium source compound comprising one or any combination of the following: LiOH, LiNO$_3$, Li$_2$CO$_3$, LiCl and LiF; a nickel source compound comprising one or any combination of the following: NiO, Ni(NO$_3$)$_2$, Ni(OH)$_2$ and NiCO$_3$; a cobalt source compound comprising one or any combination of the following: Co$_3$O$_4$, Co(OH)$_2$, CoCO$_3$, Co(NO$_3$)$_2$, CoO, and Co$_2$O$_3$; a titanium source compound comprising one or any combination of the following: TiO$_2$ in one or any combination of the following forms: anatase, rutile and brookite; and a magnesium source compound comprising one or any combination of the following: Mg(OH)$_2$, Mg(NO)$_3$, MgCO$_3$, MgCl$_2$ and MgO. Of these compounds, LiOH, Li$_2$CO$_3$, NiO, Ni(OH)$_2$, NiCO$_3$, Co$_3$O$_4$, Co(OH)$_2$, TiO$_2$, Mg(OH)$_2$, MgCO$_3$ and MgO are the most preferred. In addition, as mentioned above, commercially available compounds such as TiMgO$_3$ and Ni$_{0.75}$Ti$_{0.25}$O that can supply two cations for use in the compounds of the invention can be used as source compounds in accordance with the invention.

"Intimately mixed" as used herein refers to mixing the source compounds together sufficiently such that upon firing the source compounds can be formed into a substantially single-phase metal oxide. As discussed below in more detail, it is often preferable in accordance with the invention that the source compounds be intimately mixed such that they could form a substantially single phase metal oxide but not be fired in such a way as to form a substantially single phase metal oxide. In any event, the source compounds are preferably dry mixed, e.g., by mixing the source compounds in a ball mill to produce the intimate mixture. Alternatively, however, wet processing methods such as sol-gel type reactions and spray drying can also be used, alone or in combination with dry mixing. For example, in the case of doped lithium metal oxides, the source compounds can be intimately mixed by preparing a solution comprising M$^1$ and {A} from source compounds comprising M$^1$ and {A}, precipitating the M$^1$ and {A} out of solution to produce an intimately mixed hydroxide and blending the mixed hydroxide with a lithium source compound. The intimate mixture can also be prepared by suspending source compounds in a solution of other source compounds and spray drying the resulting slurry to obtain an intimate mixture. When the elements are mixed using wet processing methods, the mixture can generally be fired for a shorter period of time to produce the LiM$^1_{x-y}${A}$_y$O$_z$, Li$_2$M$^2$O$_3$ or LiAlO$_2$ and optional M$^2$O$_2$ compounds. Typically, the selection of mixing methods will vary depending on the raw materials used, the desired end product, and the firing temperature(s) used to make the desired end product.

The intimate mixture is fired at an initial firing temperature and optionally one or more additional firing temperatures between about 500° C. and about 1000° C. in the presence of oxygen to produce the LiM$^1_{x-y}${A}$_y$O$_z$ compound, the Li$_2$M$^2$O$_3$ or LiAlO$_2$ compound and optionally the M$^2$O$_2$ compound described above. Preferably, at least one of the initial firing temperature and the optionally one or more additional firing temperatures is between about 700° C. and about 1000° C. and more preferably at least one of the firing temperatures is between about 750° C. and about 850° C. A solid state reaction is also preferably used to produce the LiM$^1_{x-y}${A}$_y$O$_z$ compound. The intimate mixture is preferably fired in an atmosphere with a partial pressure of oxygen of at least 20 kPa and is typically fired in air. The intimate mixture can also be fired in an oxygen atmosphere with a partial pressure of at least 100 kPa. Preferably, the intimate mixture is fired at one or more firing temperatures between about 700° C. and about 1000° C. for a total firing time from about 1 hour to about 48 hours, more preferably, from about 2 hours to about 30 hours. As would be readily understood to those skilled in the art, the "ramp-up rates", firing temperatures and firing times or "soak times" are dependent on one another as well as the materials selected for Li, M$^1$ and {A} and also depend on the desired end product. For example, for compounds where M$^1$ is Ni, x=1 and z=2, a lower maximum firing temperature (e.g. 800° C.) and a longer firing time (e.g. at least 20 hours) are preferably used compared to compounds where M$^1$ is Co, x=1 and z=2, which preferably use a higher maximum firing temperature (e.g., 950–1000° C.) and a shorter firing time (e.g. 2–8 hours). Any suitable apparatus can be used for firing the mixture, such as a rotary calciner, a stationary furnace or a tunnel furnace, that uniformly heats the source compounds to produce the LiM$^1_{x-y}${A}$_y$O$_z$ compound.

The firing step according to this method embodiment of the invention comprises heating the mixture at a sufficiently slow rate from 500° C. to the maximum firing temperature to produce separate lithium metal oxide phases including LiM$^1_{x-y}${A}$_y$O$_z$, Li$_2$M$^2$O$_3$ or LiAlO$_2$ and optionally M$^2$O$_2$. Preferably, the firing step includes heating the mixture at a sufficiently slow rate from 500° C. to the maximum firing temperature to produce separate lithium metal oxide phases including LiM$^1_{x-y}${A}$_y$O$_z$ and Li$_2$M$^2$O$_3$ or LiAlO$_2$ such that the lithium metal oxide phases include greater than or equal to 95% by weight and less than 100% by weight of LiM$^1_{x-y}${A}$_y$O$_z$ and greater than 0% by weight and less than or equal to 5% by weight of Li$_2$M$^2$O$_3$ or LiAlO$_2$. The firing step can also include heating the mixture at a sufficiently slow rate from 500° C. to the maximum firing temperature to produce separate lithium metal oxide phases including LiM$^1_{x-y}${A}$_y$O$_z$, Li$_2$M$^2$O$_3$ and M$^2$O$_2$ wherein M is one of M$^1$ and B$_1$ selected from the group consisting of Ti, Zr, Sn, Mo, Si, Ge, Hf, Ru and Te. The intimate mixture can be heated from room temperature to 500° C. at any suitable rate but is preferably heated from 500° C. to the maximum firing temperature at an average ramp-up rate of less than or equal to 10° C./min and more preferably less than or equal to 8° C./min to produce the separate lithium metal oxide phases. It has been discovered that an average heating rate from 500° C. to the maximum firing temperature of less than or equal to 10° C./min is important to the formation of the Li$_2$M$^2$O$_3$ or LiAlO$_2$ phase from the source compounds and limits the conversion of the Li$_2$M$^2$O$_3$ or LiAlO$_2$ phase to the LiM$^1_{x-y}${A}$_y$O$_z$ phase at the maximum firing temperature. For example, if the mixture were heated from 500° C. to 800° C. in 10 minutes, fired at 800° C. for 30 minutes, and then heated from 800° C. to 1000° C. in 10 minutes, the average heating rate from 500° C. to the maximum firing temperature would be 10° C./min (or 500° C. in 50 minutes). The "maximum firing temperature" as would be understood by those skilled in the art is either the firing temperature used in a single firing step process or the highest firing temperature used in a multiple firing step process.

Once the intimate mixture has been fired to form the LiM$^1_{x-y}${A}$_y$O$_z$, Li$_2$M$^2$O$_3$ or LiAlO$_2$, and optional M$^2$O$_2$ compounds, these compounds are cooled. Preferably, these compounds are cooled at a rate of greater than or equal to about 0.5° C./min and less than or equal to about 140° C./min. As would be understood by those skilled in the art, the cooling rate is typically selected based on the LiM$^1_{x-y}${A}$_y$O$_z$ compound produced. For example, if M$^1$ is Ni, x=1 and z=2, a slow cooling rate is preferably used (e.g. 1–5° C./min) to facilitate the uptake of oxygen in the LiM$^1_{x-y}${A}$_y$O$_z$ compound upon cooling. However, if M$^1$ is Co, x=1 and z=2, a fast cooling rate (e.g. 8–140° C./min, more preferably 10–100° C./min) is preferably used to prevent the formation of localized cubic spinel-like structural phases on the surface of the crystallites or within the crystalline structures as described in more detail in U.S. patent application Ser. No. 09/439,620, filed on Nov. 12, 1999, now abandoned, which is incorporated by reference herein in its entirety.

The $LiM^1_{x-y}\{A\}_yO_z$, $Li_2M^2$ 03 or $LiAlO_2$, and optional $M^2O_2$ compounds are preferably uniformly cooled in accordance with the invention. In particular, substantially all of these compounds are preferably cooled at approximately the same rate. For example, the variation between the mean cooling rate and the cooling rate for any specific portion of the material should be less than about 10 percent. In a preferred embodiment of the invention, uniform cooling can be accomplished using a rotary calciner, or a stationary furnace or tunnel furnace with smaller bed depths. The uniformly cooled material prepared according to the invention has greater homogeneity and less variance in its material properties than material that is not uniformly cooled.

The positive electrode active material can be used in the positive electrode for a secondary lithium or lithium-ion battery. In particular, the positive electrode active material is typically combined with a carbonaceous material and a binder polymer to form the positive electrode for the secondary lithium or lithium-ion battery. The resulting positive electrode can then be combined with a negative electrode and a nonaqueous electrolyte to form the secondary lithium or lithium-ion battery. The negative electrode can be lithium metal or alloys, or any material capable of reversibly lithiating and delithiating at an electrochemical potential relative to lithium metal between about 0.0 V and 0.7 V, and is separated from the positive electrode material in the cell using an electronic insulating separator. Examples of negative electrode materials include carbonaceous materials containing H, B, Si and Sn; tin oxides; tin-silicon oxides; and composite tin alloys. The electrolyte can be non-aqueous liquid, gel or solid and preferably comprises a lithium salt, e.g., $LiPF_6$.

In accordance with the invention, the electronic insulating and lithium ion conducting lithium metal oxide and optional metal oxide stabilize the $LiM^1_{x-y}\{A\}_yO_z$ compound in the discharge and charge cycles of the secondary lithium or lithium-ion battery. In particular, it is believed that, because the lithium metal oxide and optional metal oxide are electronic insulators and lithium ion conductors, these compounds allow good lithium ion transfer in the positive electrode while impeding redox reactions at the interfaces of the positive electrode active material. Thus, the lithium metal oxide and optional metal oxide prevent the $LiM^1_{x-y}\{A\}_yO_z$ compound from reacting with the other battery materials. This has particularly been found to be true when the preferred synthesis method discussed above is used wherein the $LiM^1_{x-y}\{A\}_yO_z$, $Li_2M^2O_3$ or $LiAlO_2$ and optional $M^2O_2$ compounds are formed in situ because the $Li_2M^2O_3$ or $LiAlO_2$ compound (and the optional $M^2O_2$ compound) are advantageously formed on the grain boundaries between $LiM^1_{x-y}\{A\}_yO_z$ crystallites or on the surface of the $LiM^1_{x-y}\{A\}_yO_z$ particles during synthesis of the $LiM^1_{x-y}\{A\}_yO_z$ compound.

The positive electrode active material of the invention when used in secondary lithium and lithium-ion batteries has a good initial specific capacity and excellent cycleability with limited fade of the specific capacity in cycling. The positive electrode active material of the invention is also safe. Furthermore, the positive electrode active material of the invention has excellent power capability, i.e., the ability to deliver or retake energy in short periods of time. Therefore, secondary lithium and lithium-ion batteries prepared using the positive electrode active material of the invention can be used not only in portable electronics such as cellular phones, camcorders, and laptop computers, but also in large power applications such as for power tools, electric bikes and hybrid electric vehicles.

The present invention will now be further described by the following non-limiting examples.

$Li_2TiO_3$ Determination Using Powder X-ray Diffraction

X-ray powder diffraction is a standard technique for determining the amount of a particular crystalline phase present in a mixture of other crystalline phases. The technique is well known and fully explained in the literature. See, e.g., "X-ray Diffraction Procedures for Polycrystalline and Amorphous Materials," Klug & Alexander, $2^{nd}$ ed., John Wiley and Sons, New York, 1974. The measured integrated intensity of a diffraction peak characteristic of a given phase in a mixture can be related to the mass fraction (and hence to the mole fraction) of that phase in the mixture after appropriate standardization and correction constants are determined and/or calculated. For a mixture of two phases, the mass fraction of phase 1, $x_1$, can be determined from the integrated intensity of a diffraction peak representing that phase in the mixture, $I(x_1)$, based on the formula:

$$I(x_1)/I_0 = x_1(\mu/\rho)_1/\{x_1[(\mu/\rho)_1-(\mu/\rho)_2]+(\mu/\rho)_2\}$$

where $(\mu/\rho)_1$ and $(\mu/\rho)_2$ are the mass absorption coefficients of the two components and $I_0$ is the integrated intensity of the diffraction peak in a pure phase 1 sample. $(\mu/\rho)_1$ and $(\mu/\rho)_2$ can be easily calculated from tabulated values if the compositions of the phases are known. For $Li_2TiO_3$ and $LiNi_{0.7}Co_{0.2}Ti_{0.05}Mg_{0.05}O_2$, the values are 95.9 cm$^2$/g and 67.0 cm$^2$/g for CuK$\alpha$ radiation, respectively. These values can then be used to determine the mass fraction of $Li_2TiO_3$, $x_1$, in a mixture of $Li_2TiO_3$ and $LiNi_{0.7}Co_{0.2}Ti_{0.05}Mg_{0.05}O_2$ by the following formula:

$$I(x_1)/I_0 = 95.9x_1/\{x_1[95.9-67.0]+67.0\} = 95.9x_1/\{28.9x_1+67.0\}.$$

Because the $Li_2TiO_3$ loading in the $Li_2TiO_3$/$LiNi_{0.7}Co_{0.2}Ti_{0.05}Mg_{0.05}O_2$ mixture is so small (typically a maximum of ~0.05), one can ignore small changes in the $LiNi_{0.7}Co_{0.2}Ti_{0.05}Mg_{0.05}O_2$ ($\mu/\rho$) resulting from differing levels of Ti incorporation into that phase, as well as the contribution of "28.9 $x_1$" relative to the other term in the denominator. Thus, one obtains the simple linear relation:

$$I(x1) \approx 95.9 I_0 x_1/(1.4+67.0) \approx k\, x_1$$

where the constant k is determined from a mixture of known composition.

Using this approach requires that the known mixture and all samples be examined under identical experimental conditions, particularly the intensity of the X-ray source used to make the measurement. Precision under these circumstances can be difficult to obtain, especially since the low $Li_2TiO_3$ loading implies that the integrated intensities measured will be rather weak and hence quite sensitive to error. This problem can be alleviated by having a material of known scattering power in the X-ray experiment to monitor variations of incident X-ray intensity between runs. This can be conveniently done by measuring the integrated intensity of a $LiNi_{0.7}Co_{0.2}Ti_{0.05}Mg_{0.05}O_2$ diffraction peak, which constitutes the bulk of the material present in the sample.

An example of determining the amount of $Li_2TiO_3$ in a $Li_2TiO_3/LiNi_{0.7}Co_{0.2}Ti_{0.05}Mg_{0.05}O_2$ mixture is shown below and in FIG. 1. The large peak is the 104 reflection of $LiNi_{0.7}Co_{0.2}Ti_{0.05}Mg_{0.05}O_2$ and the small peak comes from $Li_2TiO_3$. Backgrounds are drawn and the net integrated intensity of each peak is determined. The mole fraction of $Li_2TiO_3$ in the mixture, $m_1$, is computed by $$m_1 = \{[I(m_1)/I(104)]/[I_s(m_s)/I_s(104)]\} m_s$$

where $I(m_1)$ and $I(104)$ are the integrated intensities of the $Li_2TiO_3$ and $LiNi_{0.7}Co_{0.2}Ti_{0.05}Mg_{0.05}O_2$ diffraction peaks in the unknown mixture and $I_s(m_s)$ and $I_s(104)$ are the integrated intensities of the $Li_2TiO_3$ and $LiNi_{0.7}Co_{0.2}Ti_{0.05}Mg_{0.05}O_2$ diffraction peaks in the mixture with known $Li_2TiO_3$ concentration $m_s$. In this case, approximately 10 m-moles of $Li_2TiO_3$ are present per mole $LiNi_{0.7}Co_{0.2}Ti_{0.05}Mg_{0.05}O_2$ in the mixture.

EXAMPLES 1–3

Stoichiometric amounts of NiO, $LiOH \cdot H_2O$, $Co_3O_4$, $TiO_2$ and $Mg(OH)_2$ with 10 molar % excess Li were thoroughly mixed to target the production of $LiNi_{0.7}Co_{0.2}Ti_{0.05}Mg_{0.05}O_2$. The mixture was fired in air at a maximum firing temperature of about 800° C. for 20 hours, then cooled at a rate of 1° C./min to 500° C. followed by natural cooling to room temperature. The average ramp-up rate from 500° C. to the maximum firing temperature was 18° C./min, 10° C./min, and 2° C./min for Examples 1, 2 and 3, respectively.

Figure 2:
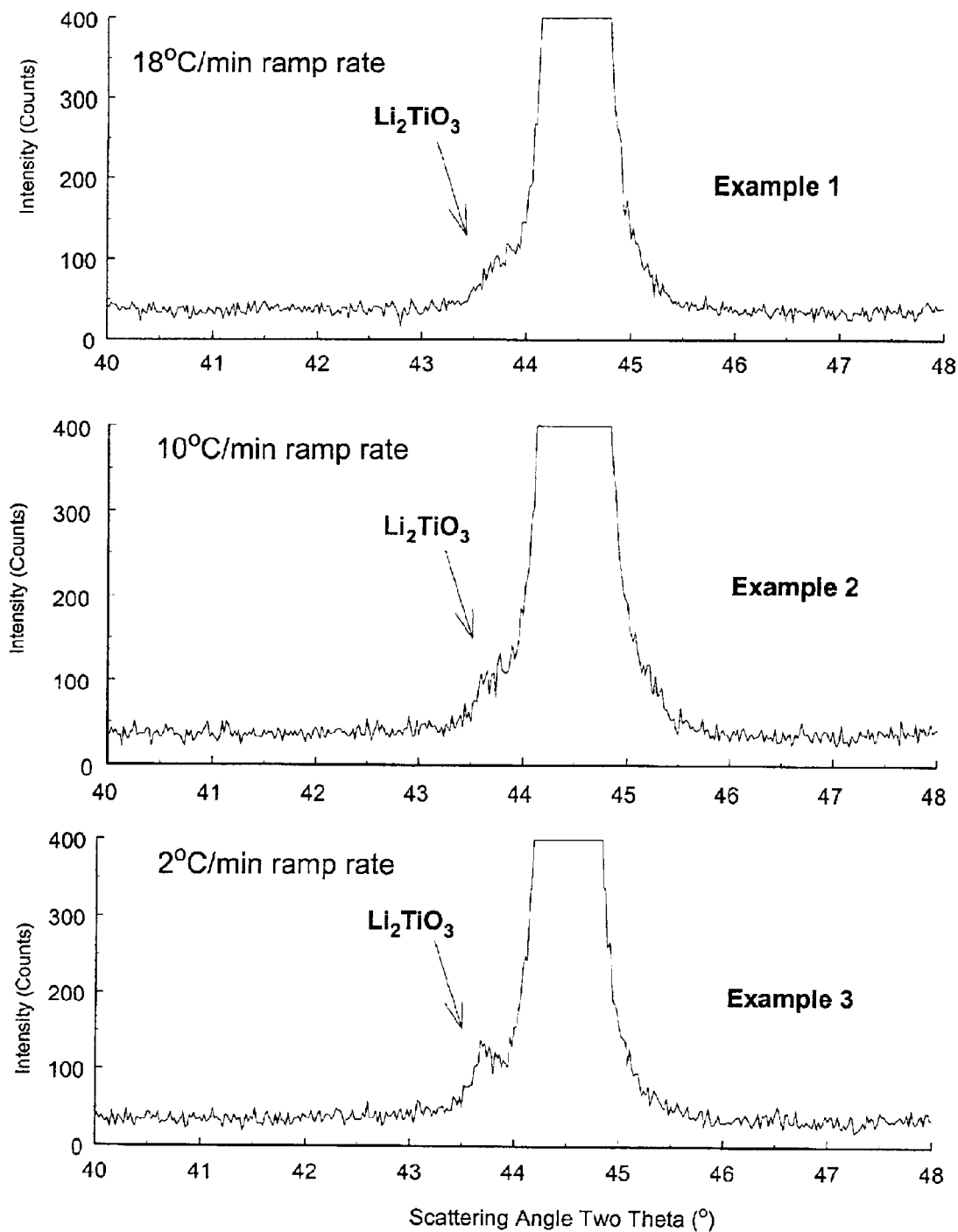
FIG. 2 includes powder x-ray diffraction diagrams for three different samples prepared using different average ramp-up rates from 500° C. to 800° C. with each diagram illustrating the lower portion of the peak representing $LiNi_{0.7}Co_{0.2}Ti_{0.05}Mg_{0.05}O_2$ ($2\theta=44.5°$) and the peak representing $Li_2TiO_3$ ($2\theta=43.7°$) at the foot of the $LiNi_{0.7}Co_{0.2}Ti_{0.05}Mg_{0.05}O_2$ peak.
Figure 3:
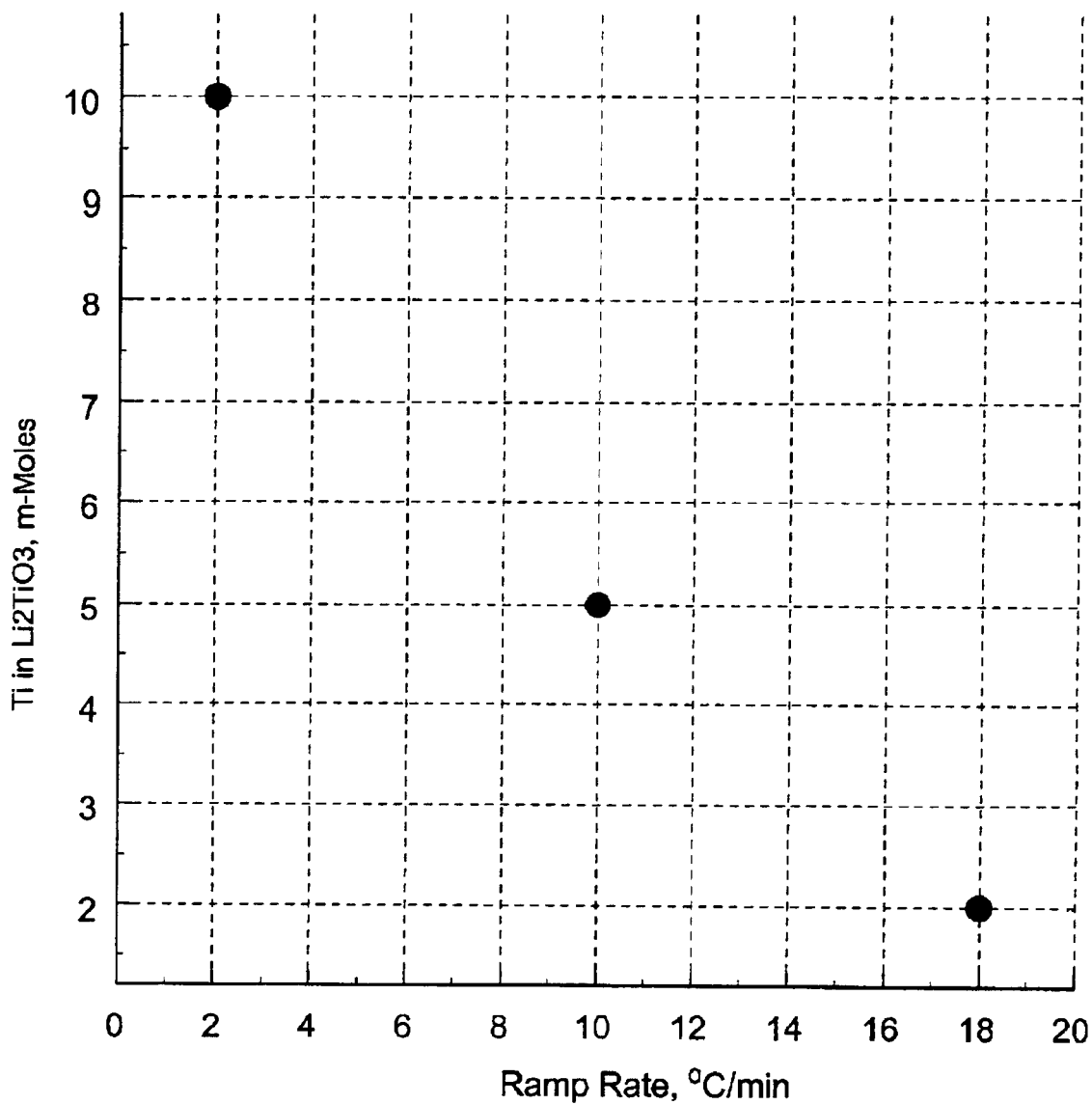
FIG. 3 is a graph of the amount of Ti that occurs in the $Li_2TiO_3$ phase, as determined by powder x-ray diffraction, as a function of the ramp rate.

FIG. 2 illustrates the x-ray diffraction spectra for the three examples. The peak representing $Li_2TiO_3$ is located in the spectra at the foot of the 104 peak of the $LiNi_{0.7}Co_{0.2}Ti_{0.05}Mg_{0.05}O_2$ main phase. FIG. 3 shows the amount of Ti in the separate $Li_2TiO_3$ phase, as determined by powder x-ray diffraction, as a function of the ramp rate. Clearly, a faster ramp rate favors increased incorporation of Ti in the $LiNi_{0.7}Co_{0.2}Ti_{0.05}Mg_{0.05}O_2$ main phase while slower ramp rates favor incorporation of a portion of the Ti in the separate $Li_2TiO_3$ phase. As shown in FIG. 3, Examples 1, 2 and 3 include 2 m-moles of Ti in the $Li_2TiO_3$ phase (0.23% by weight $Li_2TiO_3$), 5 m-moles of Ti in the $Li_2TiO_3$ phase (0.58% by weight $Li_2TiO_3$) and 10 m-moles of Ti in the $Li_2TiO_3$ phase (1.15% by weight $Li_2TiO_3$), respectively.

It is understood that upon reading the above description of the present invention and reviewing the accompany drawings, one skilled in the art could make changes and variations therefrom. These changes and variations are included in the spirit and scope of the following appended claims.

That which is claimed:

1. A positive electrode active material for secondary lithium and lithium-ion batteries comprising:
   at least one electron conducting compound existing in a first single phase having the formula $LiM^1_{x-y}\{A\}_yO_z$ wherein $M^1$ is a transition metal; $\{A\}$ is represented by the formula $\Sigma w_i B_i$ wherein $B_i$ is an element other than $M^1$ used to replace the transition metal $M^1$ and $w_i$ is the fractional amount of element $B_i$ in the total dopant combination such that $\Sigma w_i = 1$; $B_i$ is a cation in $LiM^1_{x-y}\{A\}_yO_z$; $0.95 \leq x \leq 1.05$; $0 \leq y \leq x/2$; and $1.90 \leq z \leq 2.10$; and
   at least one electron insulating and lithium ion conducting lithium metal oxide $Li_2M^2O_3$ existing in a second single phase structurally separate from the first single phase of the compound having the formula $LiM^1_{x-y}\{A\}_yO_z$, wherein $M^2$ is at least one tetravalent metal selected from the group consisting of Ti, Zr, and Hf.

2. The positive electrode active material according to claim 1, wherein the lithium metal oxide is selected from the group consisting of $Li_2TiO_3$, $Li_2ZrO_3$ and mixtures thereof.

3. The positive electrode active material according to claim 1, wherein the lithium metal oxide is $Li_2TiO_3$.

4. The positive electrode active material according to claim 1, comprising from greater than or equal to 95% by weight and less than 100% by weight of $LiM^1_{x-y}\{A\}_yO_z$ and greater than 0% by weight and less than or equal to 5% by weight of the lithium metal oxide.

5. The positive electrode active material according to claim 1, wherein $M^1$ is selected from the group consisting of Co, Ni, and Fe.

6. The positive electrode active material according to claim 1, wherein $x=1$ and $z=2$.

7. The positive electrode active material according to claim 6, wherein $M^1$ is Ni.

8. The positive electrode active material according to claim 6, wherein $M^1$ is Co.

9. The positive electrode active material according to claim 1, wherein $y > 0$.

10. The positive electrode active material according to claim 9, wherein the dopant elements $B_i$ are selected from the group consisting of elements having a Pauling's electronegativity not greater than 2.05.

11. The positive electrode active material according to claim 9, wherein the dopant elements $B_i$ include two or more dopant cations.

12. The positive electrode active material according to claim 11, wherein the average oxidation state E of the dopant elements $B_i$, as determined using the formula $E = \Sigma w_i E_i$ wherein $E_i$ is the oxidation state of dopant element $B_i$ in the lithium metal oxide $LiM^1_{x-y}\{A\}_yO_z$, is represented by the relationship $2.5 \leq E \leq 3.5$.

13. The positive electrode active material according to claim 12, wherein $2.9 \leq E \leq 3.1$.

14. The positive electrode active material according to claim 12, wherein $E = 3$.

15. The positive electrode active material according to claim 11, wherein at least one of the dopant elements $B_i$ has a different oxidation state than $M^1$ in $LiM^1_{x-y}\{A\}_yO_z$.

16. The positive electrode active material according to claim 11, wherein at least two of the dopant elements $B_i$ have a different oxidation state than $M^1$ in $LiM^1_{x-y}\{A\}_yO_z$.

17. The positive electrode active material according to claim 1, wherein x, y and z are values that provide a stable lithium metal oxide compound.

18. The positive electrode active material according to claim 1, wherein the metal $M^2$ is present in $LiM^1_{x-y}\{A\}_yO_z$ as a dopant element $B_i$.

19. The positive electrode active material according to claim 18, wherein the lithium metal oxide has the formula $Li_2M^2O_3$ and $M^2$ includes Ti.

20. The positive electrode active material according to claim 1, wherein $M^1$ is Ni or Co, $M^2$ is Ti, and the dopant elements $B_i$ include $Ti^{4+}$.

21. The positive electrode active material according to claim 20, wherein $M^1$ is Ni.

22. The positive electrode active material according to claim 1, further comprising at least one electron insulating and lithium-ion conducting metal oxide.

23. A positive electrode active material for secondary lithium and lithium-ion batteries comprising:
   at least one electron conducting compound having the formula $LiM^1_{x-y}\{A\}_yO_z$ wherein $M^1$ is a transition metal; {A} is represented by the formula $\Sigma w_i B_i$ wherein $B_i$ is an element other than $M^1$ used to replace the transition metal $M^1$ and $w_i$ is the fractional amount of element $B_i$ in the total dopant combination such that $\Sigma w_i=1$; $B_i$ is a cation in $LiM^1_{x-y}\{A\}_y O_z$; $0.95 \leq x \leq 1.05$; $0 \leq y \leq x/2$; and $1.90 \leq z \leq 2.10$;

at least one electron insulating and lithium ion conducting lithium metal oxide $Li_2 M^2 O_3$, wherein $M^2$ is at least one tetravalent metal selected from the group consisting of Ti, Zr, and Hf; and at least one electron insulating and lithium-ion conducting metal oxide, wherein the metal oxide has the formula $MO_2$ wherein M is at least one tetravalent metal selected from the group consisting of Ti, Zr, Mo, Si, Ge, Hf, Ru and Te.

24. The positive electrode active material according to claim 23, wherein $M=M^2$.

25. The positive electrode active material according to claim 24, wherein said metal oxide is $TiO_2$.

26. A positive electrode for a secondary lithium or lithium-ion battery comprising the positive electrode active material of claim 1, a carbonaceous material and a polymer binder.

27. A secondary lithium or lithium-ion battery comprising a positive electrode, a negative electrode and a nonaqueous electrolyte, wherein the positive electrode includes the positive electrode active material of claim 1.

28. A positive electrode active material for secondary lithium and lithium-ion batteries comprising at least one compound existing in a first single phase having the formula $LiM^1_{x-y}\{A\}_y O_z$ and at least one lithium metal oxide of the formula $Li_2 M^2 O_3$, existing in a second single phase structurally separate from the first single phase of the compound having the formula $LiM^1_{x-y}\{A\}_y O_z$; wherein $M^1$ is a transition metal, $M^2$ is at least one tetravalent metal {A} is represented by the formula $\Sigma w_i B_i$ wherein $B_i$ is an element other than $M^1$ used to replace the transition metal $M^1$ and $w_i$ is the fractional amount of element $B_i$ in the total dopant combination such that $\Sigma w_i=1$; $B_i$ is a cation in $LiM^1_{x-y}\{A\}_y O_z$; $0.95 \leq x \leq 2.10$; $0 \leq y \leq x/2$; and $1.90 \leq z \leq 4.20$.

29. The positive electrode active material according to claim 28, wherein the lithium metal oxide is selected from the group consisting of $Li_2 TiO_3$, $Li_2 ZrO_3$ and mixtures thereof.

30. The positive electrode active material according to claim 29, wherein the lithium metal oxide is $Li_2 TiO_3$.

31. The positive electrode active material according to claim 28, comprising from greater than or equal to 95% by weight and less than 100% by weight of $LiM^1_{x-y}\{A\}_y O_z$ and greater than 0% by weight and less than or equal to 5% by weight of the lithium metal oxide.

32. The positive electrode active material according to claim 28, wherein x=1 and z=2.

33. A positive electrode active material for secondary lithium and lithium-ion batteries comprising at least one compound of the formula $LiM^1_{x-y}\{A\}_y O_z$ and at least one lithium metal oxide of the formula $Li_2 M^2 O_3$, wherein $M^1$ is a transition metal, $M^2$ is at least one tetravalent metal {A} is represented by the formula $\Sigma w_i B_i$ wherein $B_i$ is an element other than $M^1$ used to replace the transition metal $M^1$ and $w_i$ is the fractional amount of element $B_i$ in the total dopant combination such that $\Sigma w_i=1$; $B_i$ is a cation in $LiM^1_{x-y}\{A\}_y O_z$; $0 \leq y \leq 1$; x=2; and z=4.

34. The positive electrode active material according to claim 28, wherein $M^1$ is selected from Co, Ni, and Fe.

35. The positive electrode active material according to claim 28, wherein y>0.

36. The positive electrode active material according to claim 35, wherein the dopant elements $B_i$ are selected from the group consisting of elements having a Pauling's electronegativity not greater than 2.05.

37. The positive electrode active material according to claim 35, wherein the dopant elements $B_i$ includes two or more dopant cations.

38. The positive electrode active material according to claim 37, wherein the average oxidation state E of the dopant elements $B_i$, as determined using the formula $E=\Sigma w_i E_i$ wherein $E_i$ is the oxidation state of dopant element $B_i$ in the lithium metal oxide $LiM^1_{x-y}\{A\}_y O_z$, equals the oxidation state of the replaced transition metal ion $M^1 \pm 0.5$.

39. The positive electrode active material according to claim 38, wherein E equals the oxidation state of the replaced transition metal ion $M^1 \pm 0.1$.

40. The positive electrode active material according to claim 38, wherein E equals the oxidation state of the replaced transition metal ion $M^1$.

41. The positive electrode active material according to claim 37, wherein at least one of the dopant elements $B_i$ has a different oxidation state than $M^1$ in $LiM^1_{x-y}\{A\}_y O_z$.

42. The positive electrode active material according to claim 37, wherein at least two of the dopant elements $B_i$ have a different oxidation state than $M^1$ in $LiM^1_{x-y}\{A\}_y O_z$.

43. The positive electrode active material according to claim 28, wherein x, y and z are values that provide a stable lithium metal oxide compound.

44. The positive electrode active material according to claim 28, wherein the lithium metal oxide has the formula $Li_2 M^2 O_3$ and $M^2$ includes Ti.

45. The positive electrode active material according to claim 28, further comprising at least one electron insulating and lithium ion conducting metal oxide.

46. A positive electrode active material for secondary lithium and lithium-ion batteries comprising:

at least one compound of the formula $LiM^1_{x-y}\{A\}_y O_z$ and at least one lithium metal oxide of the formula $Li_2 M^2 O_3$, wherein $M^1$ is a transition metal, $M^2$ is at least one tetravalent metal, {A} is represented by the formula $\Sigma w_i B_i$ wherein $B_i$ is an element other than $M^1$ used to replace the transition metal $M^1$ and $w_i$ is the fractional amount of element $B_i$ in the total dopant combination such that $\Sigma w_i=1$; $B_i$ is a cation in $LiM^1_{x-y}\{A\}_y O_z$; $0.95 \leq x \leq 2.10$; $0 \leq y \leq x/2$; and $1.90 \leq z \leq 4.20$; and at least one electron insulating and lithium ion conducting metal oxide, wherein the metal oxide has the formula $MO_2$ wherein M is at least one tetravalent metal selected from the group consisting of Ti, Zr, Mo, Si, Ge, Hf, Ru and Te.

47. The positive electrode active material according to claim 46, wherein $M=M^2$.

48. The positive electrode active material according to claim 46, wherein said metal oxide is $TiO_2$.

49. A positive electrode for a secondary lithium or lithium-ion battery comprising the positive electrode active material of claim 28, a carbonaceous material and a binder polymer.

50. A secondary lithium or lithium-ion battery comprising a positive electrode, a negative electrode and a nonaqueous electrolyte, wherein the positive electrode includes the positive electrode active material of claim 28.

51. A method of preparing a positive electrode active material for secondary lithium and lithium-ion batteries, the positive electrode active material including separate lithium metal oxide phases corresponding to the formulae $LiM^1_{x-y}\{A\}_y O_z$ and $Li_2 M^2 O_3$ comprising the steps of:

intimately mixing source compounds containing $M^1$, Li and optionally {A} in amounts sufficient to provide a stoichiometric relationship between $M^1$, Li and {A} corresponding to the formula $LiM^1_{x-y}\{A\}_yO_z$ wherein $M^1$ is a transition metal, {A} is represented by the formula $\Sigma w_iB_i$ wherein $B_i$ is an element other than $M^1$ used to replace the transition metal $M^1$ and $w_i$ is the fractional amount of element $B_i$ in the total dopant combination such that $\Sigma w_i=1$; $B_i$ is a cation in $LiM^1_{x-y}\{A\}_yO_z$; $0.95 \leq x \leq 2.10$; $0 \leq y \leq x/2$; and $1.90 \leq z \leq 4.20$; firing the mixture in the presence of oxygen at an initial firing temperature and optionally one or more additional firing temperatures, at least one of said initial firing temperature and optionally one or more additional firing temperatures being the maximum firing temperature and at least one of said initial firing temperature and optionally one or more additional firing temperatures being between about 700° C. and about 1000° C., wherein said firing step comprises heating the mixture at a sufficiently slow rate from 500° C. to the maximum firing temperature to produce separate lithium metal oxide phases including $LiM^1_{x-y}\{A\}_yO_z$ and $Li_2M^2O_3$, wherein $M^2$ is one of $M^1$ and $B_i$; and cooling the $LiM^1_{x-y}\{A\}_yO_z$ and $Li_2M^2O_3$ compounds.

52. The method according to claim 51, wherein said firing step comprises heating the mixture from 500° C. to the maximum firing temperature at an average rate of less than or equal to about 10° C./min.

53. The method according to claim 51, wherein said firing step comprises heating the mixture at a sufficiently slow rate from 500° C. to the maximum firing temperature to produce separate lithium metal oxide phases including $LiM^1_{x-y}\{A\}_yO_z$, $Li_2M^2O_3$ and $M^2O_2$, wherein one of $M^1$ and $B_i$ is $M^2$ and $M^2$ is selected from the group consisting of Ti, Zr, and Hf.

54. The method according to claim 51, wherein said mixing step comprises dry mixing the source compounds.

55. The method according to claim 51, wherein said mixing step comprises preparing a solution comprising $M^1$ and {A} from source compounds comprising $M^1$ and {A}, precipitating the $M^1$ and {A} out of solution to produce an intimately mixed hydroxide and blending the mixed hydroxide with a lithium source compound.

56. The method according to claim 51, wherein said firing step comprises firing the mixture at a partial pressure of oxygen of at least 20 kPa.

57. The method according to claim 51, wherein said firing step comprises heating the mixture at a sufficiently slow rate from 500° C. to the maximum firing temperature to produce separate lithium metal oxide phases including $LiM^1_{x-y}\{A\}_yO_z$ and $Li_2M^2O_3$ such that the lithium metal oxide phases include greater than or equal to 95% by weight and less than 100% by weight of $LiM^1_{x-y}\{A\}_yO_z$ and greater than 0% by weight and less than or equal to 5% by weight of $Li_2M^2O_3$.

58. The method according to claim 51, wherein said mixing step comprises mixing source compounds containing a transition metal $M^1$ selected from the group consisting of Co, Ni, and Fe.

59. The method according to claim 51, wherein said mixing step comprises mixing source compounds including dopant elements $B_i$ such that y>0.

60. The method according to claim 59, wherein said mixing step comprises mixing source compounds including dopant elements $B_i$ selected from the group consisting of elements having a Pauling's electronegativity not greater than 2.05.

61. The method according to claim 59, wherein said mixing step comprises mixing source compounds including two or more dopant elements $B_i$.

62. The method according to claim 61, wherein said mixing step comprises mixing source compounds wherein the average oxidation state E of the dopant elements $B_i$, as determined using the formula $E=\Sigma w_iE_i$ wherein $E_i$ is the oxidation state of dopant element $B_i$ in the lithium metal oxide $LiM^1_{x-y}\{A\}_yO_z$, equals the oxidation state of the replaced transition metal ion $M^1 \pm 0.5$.

63. The method according to claim 61, wherein said mixing step comprises mixing source compounds wherein the average oxidation state E of the dopant elements $B_i$, as determined using the formula $E=\Sigma w_iE_i$ wherein $E_i$ is the oxidation state of dopant element $B_i$ in the lithium metal oxide $LiM^1_{x-y}\{A\}_yO_z$ equals the oxidation state of the replaced transition metal ion $M^1 \pm 0.1$.

64. The method according to claim 61, wherein said mixing step comprises mixing source compounds wherein the average oxidation state E of the dopant elements $B_i$, as determined using the formula $E=\Sigma w_iE_i$ wherein $E_i$ is the oxidation state of dopant element $B_i$ in the lithium metal oxide $LiM^1_{x-y}\{A\}_yO_z$, equals the oxidation state of the replaced transition metal ion $M^1$.

65. The method according to claim 61, wherein said mixing step comprises mixing source compounds wherein at least one of the dopant elements $B_i$ has a different oxidation state than $M^1$ in $LiM^1_{x-y}\{A\}_yO_z$.

66. The method according to claim 61, wherein said mixing step comprises mixing source compounds wherein at least two of the dopant elements $B_i$ has a different oxidation state than $M^1$ in $LiM^1_{x-y}\{A\}_yO_z$.

67. The method according to claim 61, wherein said mixing step comprises mixing source compounds in amounts sufficient to provide values for x, y and z that provide a stable metal oxide compound.

68. The method according to claim 51, wherein said mixing step comprises mixing the source compounds in amounts sufficient to produce a $LiM^1_{x-y}\{A\}_yO_z$ compound wherein x=1 and z=2.

69. The method according to claim 68, wherein said mixing step comprises mixing source compounds containing Ni or Co as the transition metal $M^1$.

70. The method according to claim 69, wherein said mixing step comprises mixing source compounds containing $Ti^{4+}$ as a dopant element $B_i$.

71. The method according to claim 70, wherein said mixing step comprises mixing source compounds containing Ni as the transition metal $M^1$.

72. The method according to claim 69, wherein said mixing step comprises mixing source compounds containing Co as the transition metal $M^1$.

73. The method according to claim 51, wherein said mixing step comprises mixing source compounds containing Li, Ni, Co, $M^3$ and $M^4$ in amounts sufficient to provide a stoichiometric relationship between Li, Ni, Co, $M^3$ and $M^4$ corresponding to the formula $LiNi_{1-y}Co_aM^3_bM^4_cO_2$ wherein $M^3$ is selected from the group consisting of Ti, Zr, and combinations thereof; $M^4$ is selected from the group consisting of Mg, Ca, Sr, Ba, and combinations thereof; $M^2$ is $M^3$; y=a+b+c, $0<y \leq 0.5$; $0<a<0.5$; $0<b \leq 0.15$; and $0<c \leq 0.15$.

74. The method according to claim 51, wherein said mixing step comprises mixing the source compounds in amounts sufficient to produce a $LiM^1_{x-y}\{A\}_yO_z$ compound wherein x=2 and z=4.

75. The method according to claim 51, wherein said cooling step comprises cooling the $LiM^1_{x-y}\{A\}_yO_z$ and $Li_2M^2O_3$ compounds at a rate of greater than or equal to about 0.5° C./min and less than or equal to about 140° C./min.

76. The method according to claim 51, wherein said mixing step comprises mixing source compounds such that excess of the source compound containing lithium is provided in the mixture.

77. A method of preparing a positive electrode active material for secondary lithium and lithium-ion batteries, the positive electrode active material including separate lithium metal oxide phases corresponding to the formulae $LiNi_{1-y}Co_aM^3{}_bM^4{}_cO_2$ and $Li_2M^3O_3$ comprising the steps of:

intimately mixing source compounds containing Li, Ni, Co, $M^3$ and $M^4$ in amounts sufficient to provide a stoichiometric relationship between Li, Ni, Co, $M^3$ and $M^4$ corresponding to the formula $LiNi_{1-y}Co_aM^3{}_bM^4{}_cO_2$ wherein $M^3$ is selected from the group consisting of Ti, Zr and combinations thereof; $M^4$ is selected from the group consisting of Mg, Ca, Sr, Ba, and combinations thereof; $y=a+b+c$, $0<y\leq0.5$; $0<a<0.5$; $0<b\leq0.15$; and $0<c\leq0.15$;

firing the mixture in the presence of oxygen at an initial firing temperature and optionally one or more additional firing temperatures wherein at least one of the firing temperatures is the maximum firing temperature and wherein at least one of the firing temperatures is between about 700° C. and about 1000° C., said firing step comprising heating the mixture from 500° C. to the maximum firing temperature at an average rate of less than or equal to 10° C./min to produce separate lithium metal oxide phases including $LiNi_{1-y}Co_aM^3{}_bM^4{}_cO_2$ and $Li_2M^3O_3$; and cooling the $LiNi_{1-y}Co_aM^3{}_bM^4{}_cO_2$ and $Li_2M^3O_3$ compounds.

78. The method according to claim 77, said mixing step comprises mixing source compounds such that $M^3$ includes Ti.

79. The method according to claim 78, wherein said mixing step comprises mixing source compounds such that $M^4$ includes Mg.

80. A positive electrode active material, comprising:

at least one electron conducting compound existing in a first single phase having the formula $LiM^1{}_{x-y}\{A\}_yO_z$ wherein $M^1$ is a transition metal, $\{A\}$ is represented by the formula $\Sigma w_iB_i$ wherein $B_i$ comprises at least one element having a Pauling's electronegativity not greater than 2.05 and $w_i$ is the fractional amount of element $B_i$ in the total dopant combination such that $\Sigma w_i=1$, $0.95\leq x\leq1.05$, $0\leq y\leq x/2$, and $1.90\leq z\leq2.10$; and at least one electron insulating and lithium ion conducting lithium metal oxide of the formula $LiM^2O_3$, existing in a second single phase structurally separate from the first single phase of the compound having the formula $LiM^1{}_{x-y}\{A\}_yO_z$ wherein $M^2$ is at least one tetravalent metal.

* * * * *